United States Patent
Klein et al.

(10) Patent No.: US 9,734,394 B2
(45) Date of Patent: Aug. 15, 2017

(54) SYSTEMS AND METHODS FOR TEMPORALLY-BASED GEOSPATIAL DATA CONFLATION

(71) Applicant: THE BOEING COMPANY, Huntington Beach, CA (US)

(72) Inventors: Robert J. Klein, Ballwin, MO (US); Anthony W. Baker, Gilbertsville, PA (US)

(73) Assignee: The Boeing Company, Chicago, IL (US)

(*) Notice: Subject to any disclaimer, the term of this patent is extended or adjusted under 35 U.S.C. 154(b) by 137 days.

(21) Appl. No.: 14/619,754

(22) Filed: Feb. 11, 2015

(65) Prior Publication Data

US 2016/0232424 A1   Aug. 11, 2016

(51) Int. Cl.
*G06T 7/33*  (2017.01)
*G06K 9/00*  (2006.01)
*G06F 17/30*  (2006.01)
*G06K 9/62*  (2006.01)

(52) U.S. Cl.
CPC ..... *G06K 9/00476* (2013.01); *G06F 17/3028* (2013.01); *G06T 7/33* (2017.01); *G06K 9/6211* (2013.01); *G06T 2207/10032* (2013.01); *G06T 2207/10044* (2013.01); *G06T 2207/10048* (2013.01); *G06T 2207/30236* (2013.01)

(58) Field of Classification Search
CPC .. G06F 17/3028; G06K 9/00476; G06K 9/52; G06K 9/6211; G06T 7/0028; G06T 2207/10032; G06T 7/33
See application file for complete search history.

(56) References Cited

U.S. PATENT DOCUMENTS

| | | | |
|---|---|---|---|
| 6,597,818 B2 | 7/2003 | Kumar et al. | |
| 6,684,219 B1 | 1/2004 | Shaw et al. | |
| 8,675,995 B2 | 3/2014 | Chen et al. | |
| 2006/0241898 A1* | 10/2006 | Seedahmed | G06K 9/6205 702/152 |
| 2011/0280453 A1 | 11/2011 | Chen et al. | |

* cited by examiner

*Primary Examiner* — Siamak Harandi
(74) *Attorney, Agent, or Firm* — Armstrong Teasdale LLP

(57) ABSTRACT

A method for registering existing vector data associated with a first image of a location to a second image of the location is provided. Typically the images are separated by an increment of time. The method is implemented by at least one computing device including at least one processor in communication with a memory. The method includes receiving, by the at least one computing device, the existing vector data associated with the first image of the location, receiving, by the at least one computing device, a plurality of controls for registering the first image to the second image, applying, by the at least one computing device, the plurality of controls to the existing vector data to generate updated vector data, and storing, in the memory, the updated vector data associated with the second image.

17 Claims, 8 Drawing Sheets

SYSTEMS AND METHODS FOR TEMPORALLY-BASED GEOSPATIAL DATA CONFLATION

BACKGROUND

The present disclosure relates generally to updating geospatial data, and more specifically to updating an old image's vector data to fit a new image of the same geographic area.

Geospatial data is information that identifies a geographic location and characteristics of natural or constructed features and boundaries on the earth. In some known systems, geospatial data location is sometimes collected from images of the location. The images may be captured using visible light cameras, near infrared (NIR) sensors, radar, thermal imaging sensors, or any other suitable sensor for capturing images of a geographic location. The images are often captured by sensors in one or more satellites or aerial vehicles. In some known systems, the images are analyzed to identify features shown in the images using vectors. The vectors are typically polygons, lines (or arcs), or point data that are used to represent attributes shown in the image being analyzed. Polygons are typically used to represent boundaries of areas, buildings, lakes, and the like. Lines (or arcs) are typically used to represent relatively linear features, such as roads, rivers, trails, etc. Point vector data is commonly used to identify discrete data points of interest in the image. Collecting vector data from images is generally a relatively slow and costly manual process. Vector data generated from images typically will not line up with the newer images of the same location due to differences in sensor, height, angle of the image, etc. Thus, when newer images of a location are acquired, all vector data for the location must be recollected (even vector data for unchanged features). It would be beneficial to update old vector data to new images automatically or semi-automatically.

BRIEF DESCRIPTION

In one aspect, a method for registering existing vector data associated with a first image of a location to a second image of the location is implemented by at least one computing device including at least one processor in communication with a memory. The method includes receiving, by the at least one computing device, the existing vector data associated with the first image of the location, receiving, by the at least one computing device, a plurality of controls for registering the first image to the second image, applying, by the at least one computing device, the plurality of controls to the existing vector data to generate updated vector data, and storing, in the memory, the updated vector data associated with the second image.

In another aspect, a system for use in registering existing vector data associated with a first image of a location to a second image of the location is provided. The system includes at least one computing device in communication with a memory. The computing device is configured to receive the existing vector data associated with the first image of the location, receive a plurality of controls for registering the first image to the second image, apply the plurality of controls to the existing vector data to generate updated vector data, and store, in the memory, the updated vector data associated with the second image.

In another aspect, a computer-readable storage medium having computer-executable instructions embodied thereon for use in registering existing vector data associated with a first image of a location to a second images is provided. When executed by a computing device including a processor coupled to a memory, the computer-executable instructions cause the computing device to receive the existing vector data associated with the first image of the location, receive a plurality of controls for registering the first image to the second image, apply the plurality of controls to the existing vector data to generate updated vector data, and store, in the memory, the updated vector data associated with the second image.

DETAILED DESCRIPTION

Methods and systems for use in updating geospatial data are disclosed herein. More specifically, the methods and systems described herein may be used for automatic and semi-automatic updating an old image's vector data to fit a new image of the same geographic area.

Figure 1:
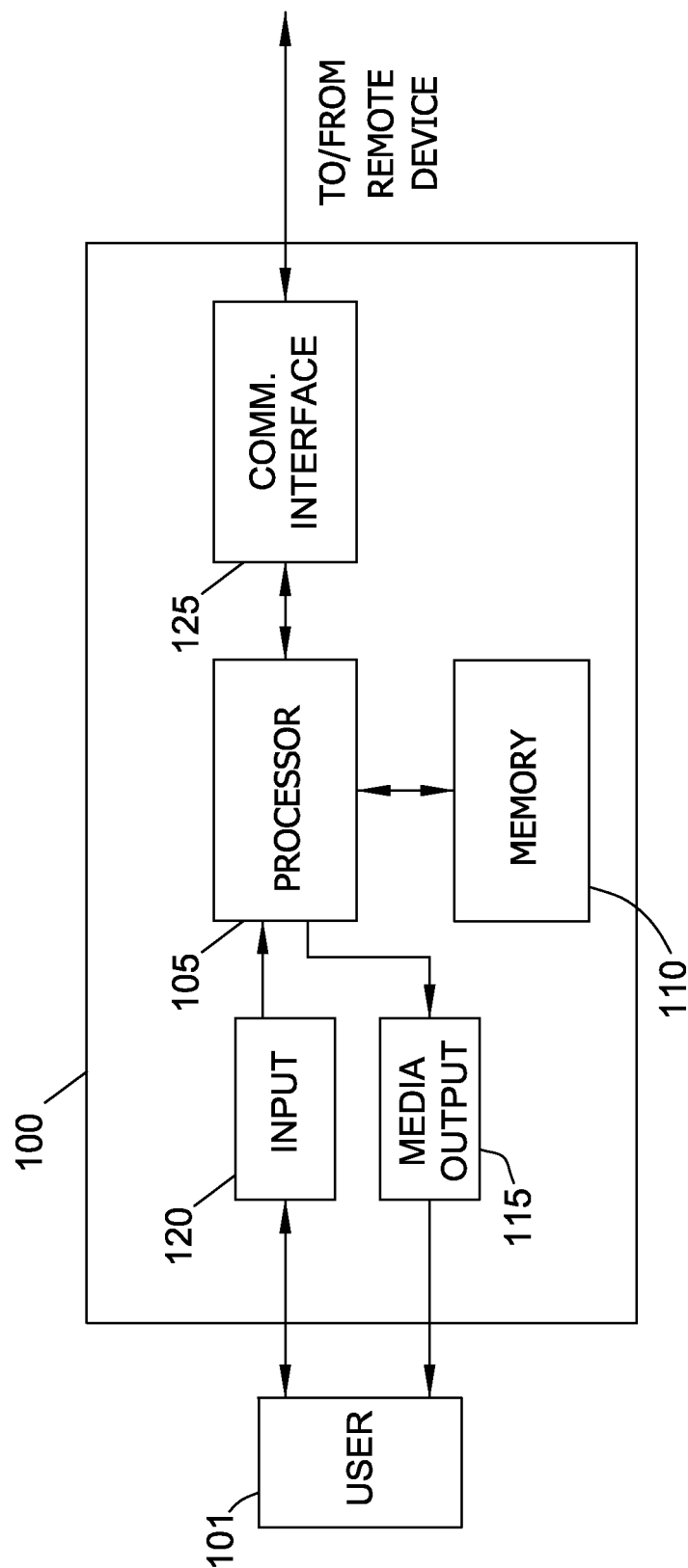
FIG. 1 is a diagram of an example client computing device that may be used to update vector data derived from a first image of a geographic location to fit a second image of the geographic location.

Exemplary implementations are performed using computing devices. FIG. 1 is a diagram of an example client computing device 100 that may be used to update vector data derived from a first image of a geographic location to fit a second image of the geographic location.

Client computing device 100 includes a processor 105 for executing instructions. In some embodiments, executable instructions are stored in a memory area 110. Processor 105 may include one or more processing units (e.g., in a multi-core configuration). Memory area 110 is any device allowing information such as executable instructions and/or other data to be stored and retrieved. Memory area 110 may include one or more computer-readable media.

Client computing device 100 also includes at least one media output component 115 for presenting information to a user 101. Media output component 115 is any component capable of conveying information to user 101. In some embodiments, media output component 115 includes an output adapter such as a video adapter and/or an audio adapter. An output adapter is operatively coupled to processor 105 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 100 includes an input device 120 for receiving input from user 101. Input device 120 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 115 and input device 120.

Client computing device 100 may also include a communication interface 125, which is communicatively coupleable to a remote device such as server system 102. Communication interface 125 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 110 are, for example, computer-readable instructions for providing a user interface to user 101 via media output component 115 and, optionally, receiving and processing input from input device 120. A user interface may include, among other possibilities, a web browser and/or client application that provides and/or receives information from user 101.

Figure 2:
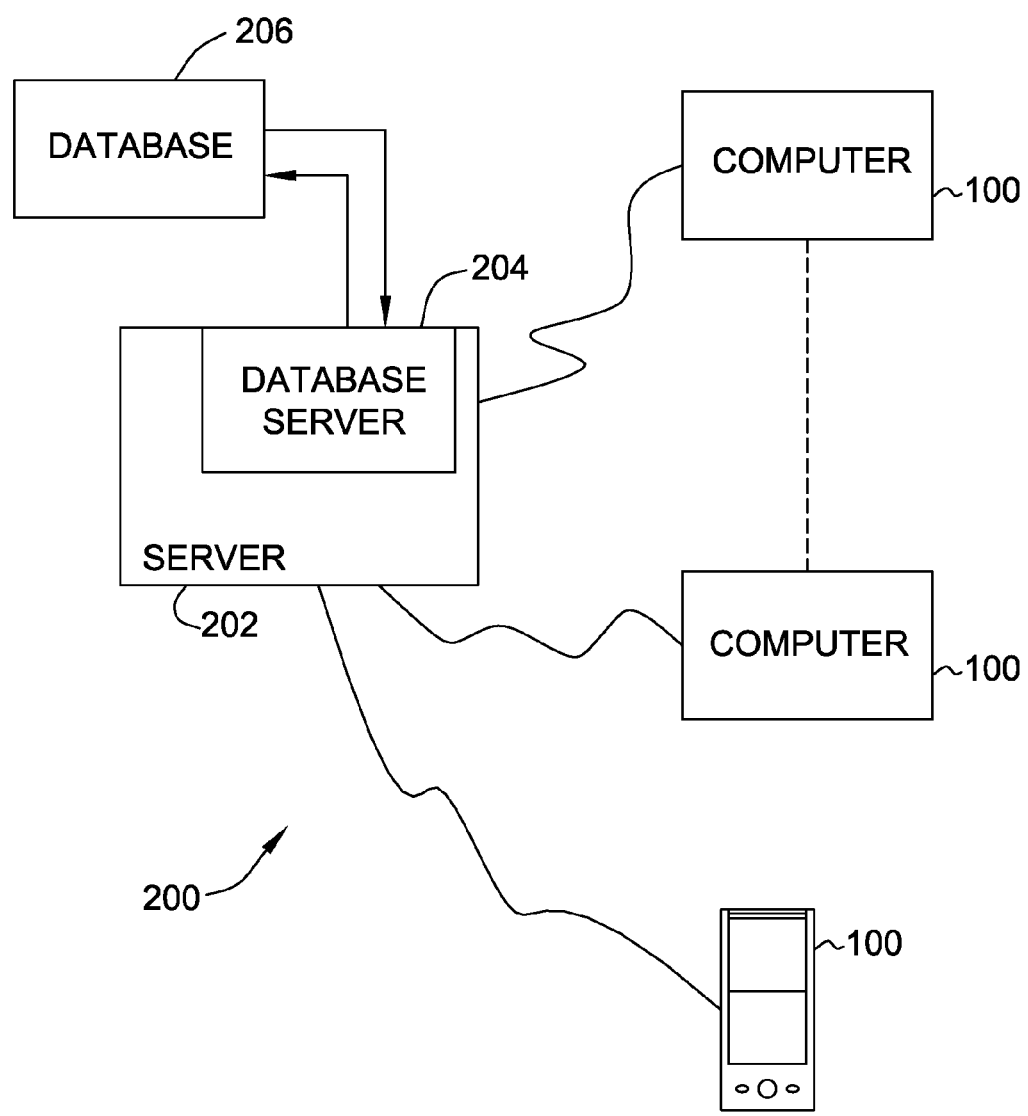
FIG. 2 is a simplified diagram of an exemplary network including the computing device shown in FIG. 1.

Some exemplary implementations are implemented using a network of computing devices, such as computing devices 100. FIG. 2 is a simplified block diagram of an exemplary network 200 of computing devices 100.

More specifically, in the example implementation, system 200 includes a server system 202, which is a type of computer system, and a plurality of computing devices 100 connected to server system 202. In one implementation, server system 202 is accessible to computing devices 100 using the Internet. In other implementations, server system 202 may be accessible using any other suitable communication network, including, for example, a wide area network (WAN), a local area network (LAN), etc. Computing devices 100 may be interconnected to the Internet through many interfaces including a network, such as a local area network (LAN) or a wide area network (WAN), dial-in-connections, cable modems, and special high-speed ISDN lines. Computing devices 100 may be any device capable of interconnecting to the Internet including a web-based phone, personal digital assistant (PDA), or other web-based connectable equipment.

A database server 204 is connected to database 206, which may contain information on a variety of matters, including sensor data as described below in greater detail. In one implementation, centralized database 206 is stored on server system 202 and can be accessed by logging onto server system 202 through one of computing devices 100. In an alternative implementation, database 206 is stored remotely from server system 202 and may be non-centralized. Moreover, in some embodiments, database 206 and database server 204 utilize role-based authentication.

Figure 3:
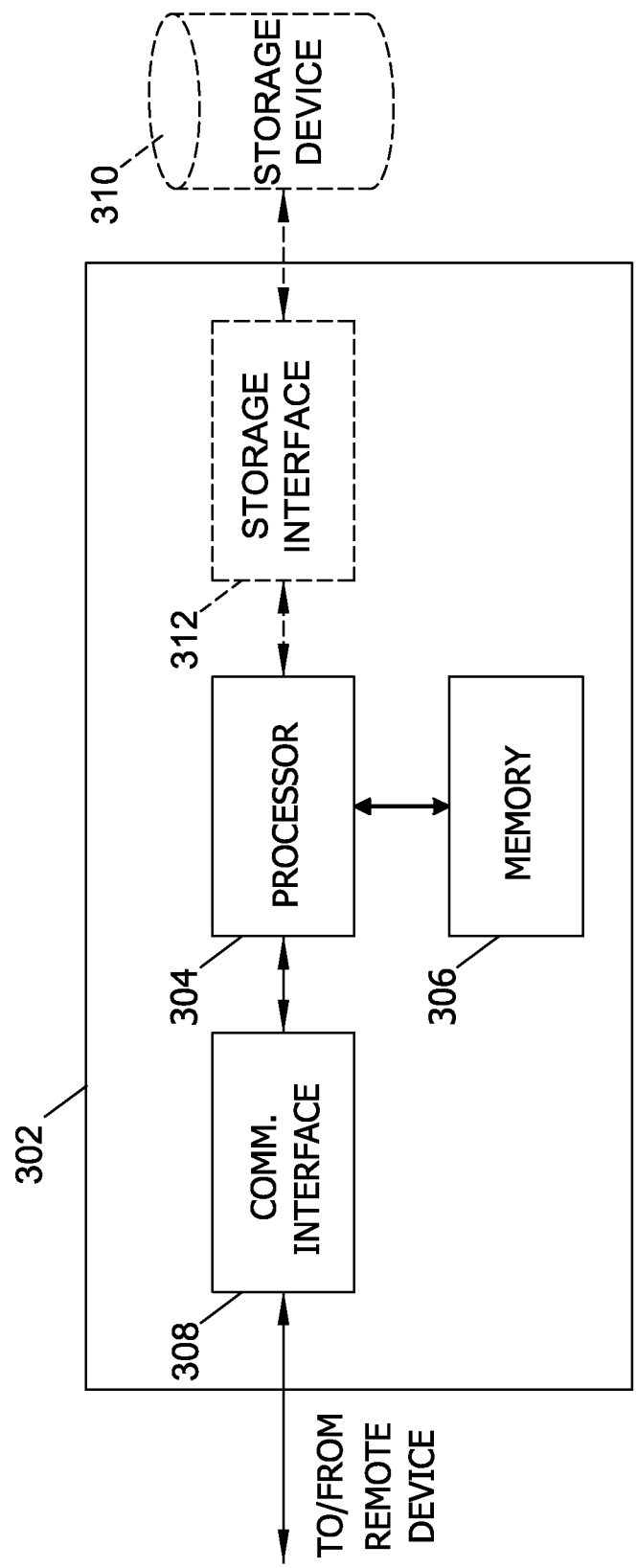
FIG. 3 is a diagram of an example server computing device used in the network shown in FIG. 2.

FIG. 3 illustrates an example configuration of a server computing device 302 used in network 200. Server computing device 302 is representative of server system 202. Server computing device 302 includes a processor 304 for executing instructions. Instructions may be stored in a memory area 306, for example. Processor 304 may include one or more processing units (e.g., in a multi-core configuration).

Processor 304 is operatively coupled to a communication interface 308 such that server computing device 302 is capable of communicating with a remote device such as client computing device 100 or another server computing device 302. For example, communication interface 308 may receive requests from client system 106 via a network, such as the Internet or a local area network (LAN).

Processor 304 may also be operatively coupled to a storage device 310. Storage device 310 is representative of repository 104 (FIG. 1). Storage device 310 is any computer-operated hardware suitable for storing and/or retrieving data. In some embodiments, storage device 310 is integrated in server computing device 302. For example, server computing device 302 may include one or more hard disk drives as storage device 310. In other embodiments, storage device 310 is external to server computing device 302 and may be accessed by a plurality of server computing devices 302. For example, storage device 310 may include multiple storage units such as hard disks or solid state disks in a redundant array of inexpensive disks (RAID) configuration. Storage device 310 may include a storage area network (SAN) and/or a network attached storage (NAS) system. In some implementations, storage device 310 stores real time information (e.g., parameters) pertaining to the manufacture of a part.

In some embodiments, processor 304 is operatively coupled to storage device 310 via a storage interface 312. Storage interface 312 is any component capable of providing processor 304 with access to storage device 310. Storage interface 312 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 304 with access to storage device 310.

Memory areas 210 and 306 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 4:
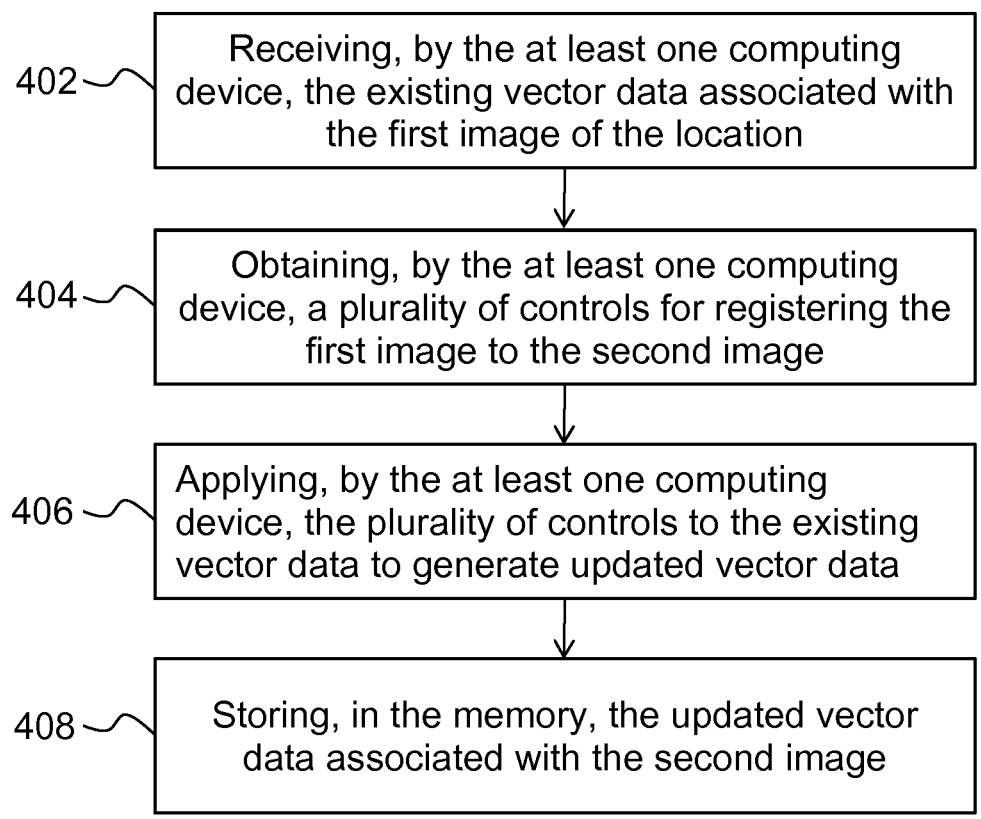
FIG. 4 is a flow diagram of an example process for registering vector data associated with a first image of a location to a second image of the location.

FIG. 4 is a flow diagram of an example process 400 for registering vector data associated with a first image of a location to a second image of the location. Process 400 is implemented by at least one computing device, for example computing device 100. Computing device 100 receives 402 existing vector data associated with the first image of the location and obtains 404 a plurality of controls for generating updated vector data. The controls may be generated based on registering the first image to the second image. Computing device 100 applies 406 the plurality of controls to the existing vector data to generate updated vector data and stores 408, in memory, the updated vector data associated with the second image. In this example, first image may be an old image of a geographical area, and second image may be a new image of the same geographical area. The process of generating controls based on registration of the old image to the new image and applying the controls to the old vector data to generate updated vector data for the new image may be performed automatically without need to manually recollect vector data for the new image.

Figure 5:
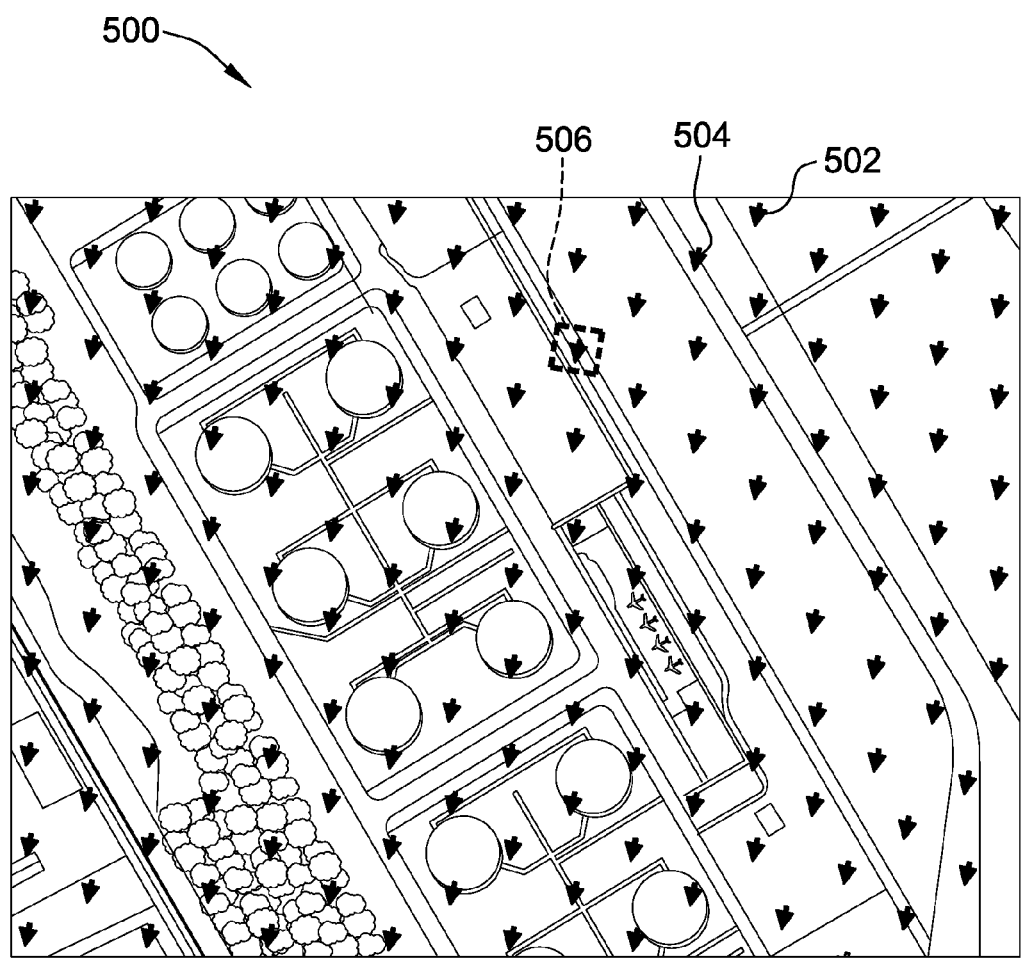
FIG. 5 is an example first image with controls for registering the first image to a second image.

In the exemplary implementation, computing device obtains 404 the plurality of controls, the plurality of controls based on registering the first image to the second image. Each control may identify control data associating first image data with second image data. For example, each control may comprise a control vector pointing from a point or group of points on the first image to a corresponding point or group of points on the second image. The controls define manipulations to the first image that will produce the second image. For example, a control may define one point or a group of points in the first image to be translated by a horizontal pixel offset and a vertical pixel offset to produce the second image. Other units of measure such as a user-defined coordinate system, latitude or longitude, or other measures of manipulation may be used as appropriate for the image. FIG. 5 is an example first image 500 with controls 502 based on registering first image 500 to a second image (not shown). Each control 502 is associated with a point 504 on first image 500 and pointing to and associated with a corresponding point on the second image. The first and second points are the location in the first and second images of the same real world location/point. Each control 502 indicates which direction and by how much the associated point in first image 500 needs to be moved to register first image 500 to the second image. In some implementations, controls 502 are associated with groups of points on first image, such as region 506. First image 500 includes a plurality of pixels (not individually visible). In the exemplary implementation, there are fewer controls 502 than there are pixels in first image 500. In other implementations, each pixel in the first image is associated with a control.

In some implementations, computing device 100 obtains the plurality of controls by generating the plurality of controls based on registering the first image to the second image. Computing device 100 generates the controls using any suitable image registration technique. In some implementations, a control may include a likelihood score indicative of a low or high area of change from first image to second image, and/or a correlation of matching. In some implementations, the controls are generated using an oriented fast and rotated brief (ORB) detector, a binary robust independent elementary features (BRIEF) detector, a speeded up robust features (SURF) detector, or any other pattern/feature matching technique capable of producing controls for registering a first image to a second image.

In other implementations, computing device 100 obtains the plurality of controls by receiving the plurality of controls, such as from another computing device 100.

Computing device 100 applies 406 the plurality of controls to the existing vector data to generate updated vector data. In the exemplary implementation, computing device 100 applies the set of controls to the existing vector data by translating each vector data point along the control vector associated with the vector data point's corresponding point in the first image. Thus, the vector data is moved in the same manner as the points of the first image to which the vector data corresponds and will register with the second image to the same extent that the controls register the first image to the second image.

Figure 6:
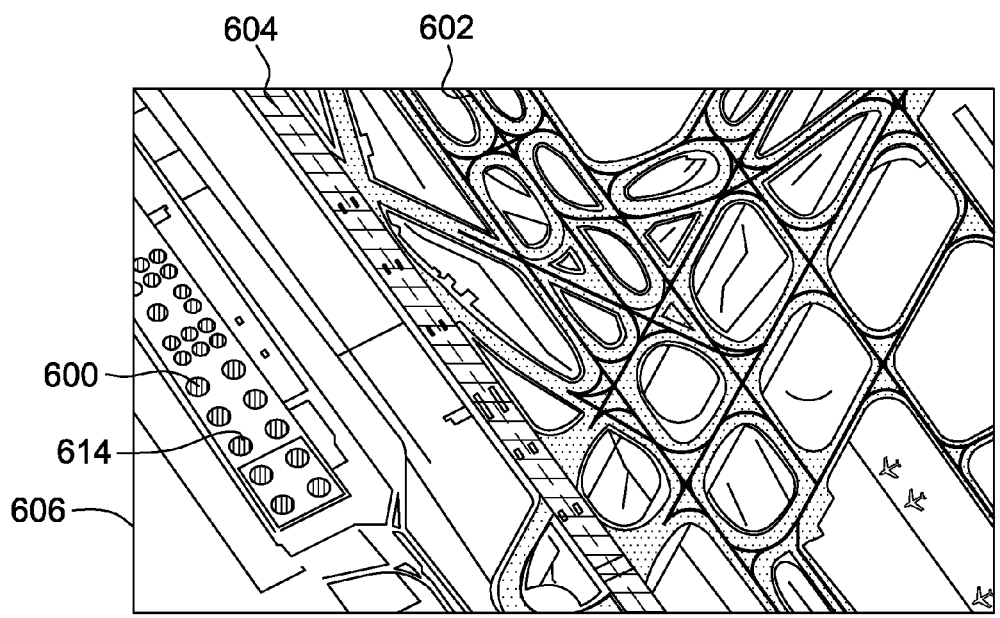
FIG. 6 is an example first image of a location with vector data extracted from the first image overlying the first image.
Figure 7:
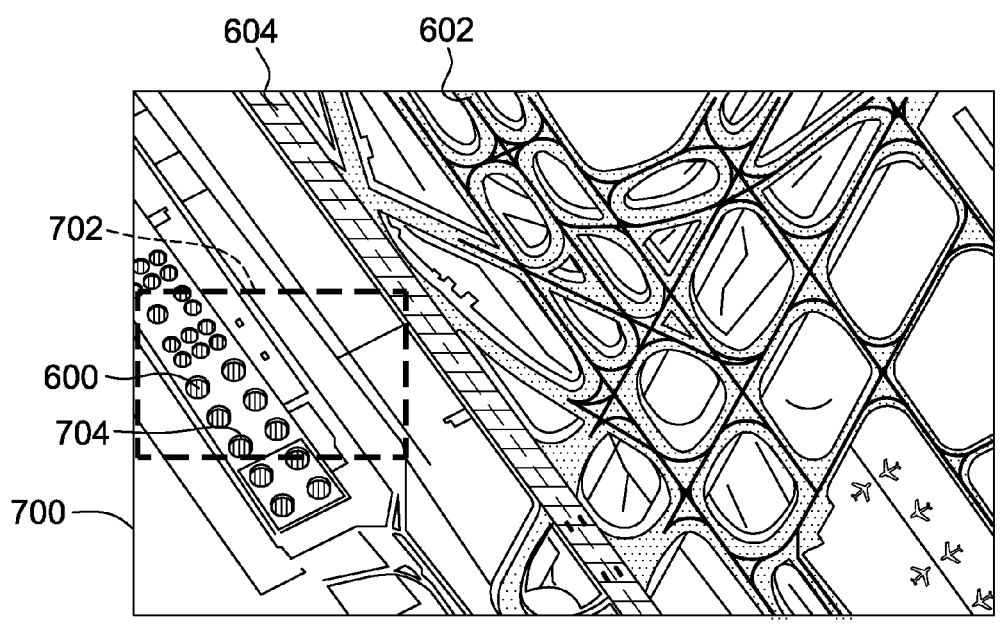
FIG. 7 is an example second image of the location with the vector data shown in FIG. 6 overlying the second image.
Figure 8:
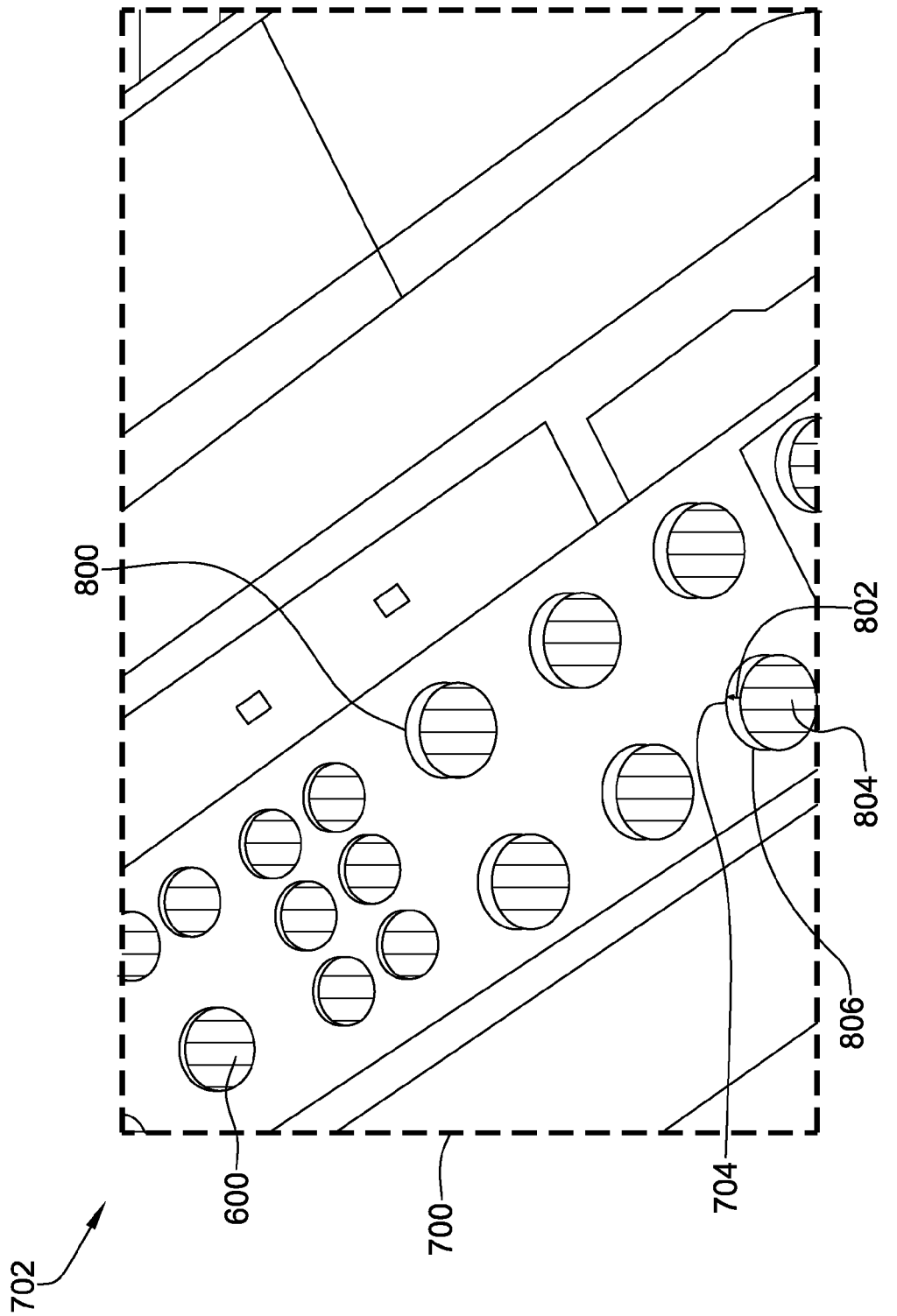
FIG. 8 is an enlarged view of a portion of the second image shown in FIG. 7.
Figure 9:
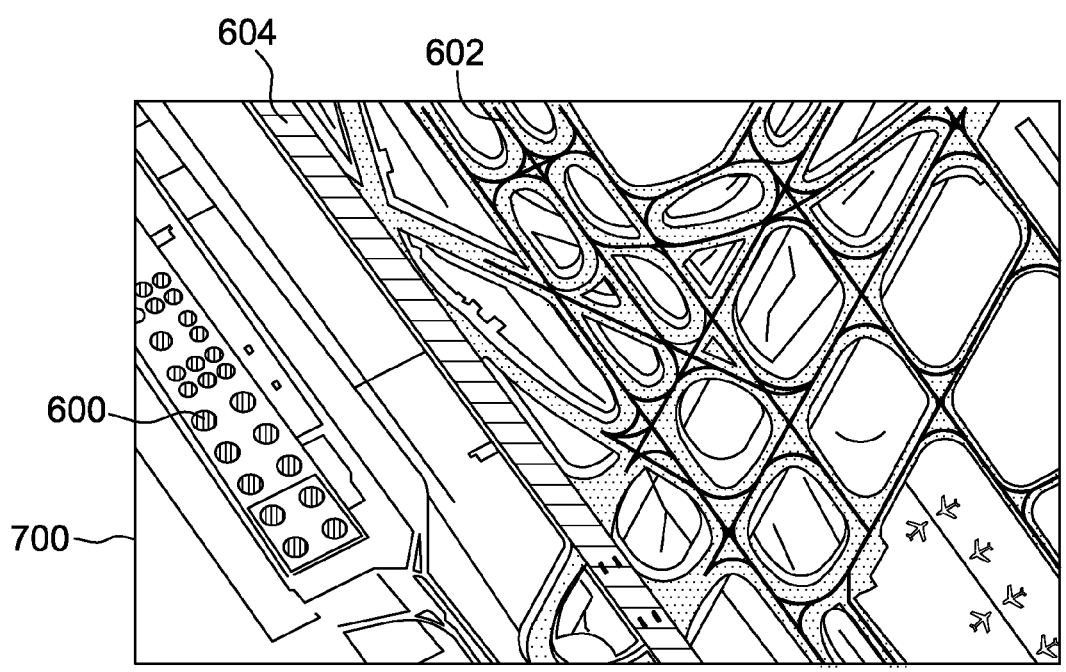
FIG. 9 is the second image shown in FIG. 7 overlaid by vector data updated by controls for registering the first image shown in FIG. 6 to second image shown in FIG. 7.

FIGS. 6-9 show the process and results of registering vector data associated with a first image of a location to a second image of the location as described herein. FIG. 6 includes vector data 600, 602, and 604 extracted from a first image 606 of a location overlying the first image 606. Vector data 600 represents storage tanks, vector data 602 represents taxiways, and vector data represents runway 604 shown in image 606. In FIG. 7, vector data 600, 602, and 604 overlies a second image 700 of the same location. A portion 702 of FIG. 7 is enlarged in FIG. 8. As can be seen in FIGS. 7 and 8, vector data 600, 602, and 604 does not align with (i.e., is not registered to) second image 700. In FIG. 8, for example, it can be seen that vector data 600, does not align properly with storage tanks 800 in second image 700. Vector data 600, 602, and 604 is adjusted according to controls, e.g., controls 502, for registering first image 606 to second image 700. FIG. 8 includes a theoretical control 802 associated with a first point 614 on first image 606 (shown in FIG. 6) and a corresponding second point 704 (shown in FIGS. 7 and 8). If vector polygon 804, which is part of vector data 600, is translated the direction and amount indicated by control 802, it will align with storage tank 806 the same degree that it did in first image 606 (shown in FIG. 6). FIG. 9 includes second image 700 with vector data 600, 602, and 604 updated by application of the controls for registering first image 606 to second image 700.

A technical effect of systems and methods described herein includes at least one of: (a) receiving existing vector data associated with a first image of a location; (b) obtaining a plurality of controls for registering the first image to a second image of the location; (c) applying, the plurality of controls to the existing vector data to generate updated vector data; and (d) storing the updated vector data associated with the second image.

The methods and systems described herein automatically and/or semi-automatically update existing vector data from an older image of the location using the same controls that are generated for registering the older image of the location to the new image of the location. As compared to known methods and systems for extracting vector data from a new image of a location, the methods and systems described herein are faster, less expensive, and require less manual feature extraction.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for registering existing vector data associated with a first image of a location to a second image, the method is implemented by at least one computing device including at least one processor in communication with a memory, the method comprising:
receiving, by the at least one computing device, the first image of the location, the second image of the location, and the existing vector data associated with the first image of the location;

identifying, by the at least one computing device, a first plurality of points in the first image and a second plurality of points in the second image, wherein the first plurality of points correspond to one or more locations in the first image, and wherein the second plurality of points correspond to the one or more location in the second image;

identifying, by the at least one computing device, a plurality of controls determined based on the first plurality of points and the second plurality of points;

applying, by the at least one computing device, the plurality of controls to the existing vector data to generate updated vector data, wherein the updated vector data is associated with the second image of the location; and storing, in the memory, the updated vector data associated with the second image.

2. The method of claim 1, wherein obtaining a plurality of controls determined by registering the first image to the second image comprises generating the plurality of controls by registering the first image to the second image.

3. The method of claim 1, wherein obtaining the plurality of controls comprises receiving a plurality of controls, each control comprising a control vector associated with at least one point in the first image and a corresponding at least one point in the second image.

4. The method of claim 3, wherein receiving the plurality of controls comprises receiving a plurality of controls, each control comprising a control vector pointing from its associated at least one point in the first image to its associated at least one point in the second image.

5. The method of claim 4, wherein the existing vector data comprises a plurality of vector data points and each vector data point corresponds to a point in the first image, and wherein applying the set of controls to the existing vector data comprises translating each vector data point along the control vector associated with the vector data point's corresponding point in the first image.

6. The method of claim 3, wherein the first image comprises a number of pixels, and receiving a plurality of controls comprises receiving fewer controls than the number of pixels in the first image.

7. A system for use in registering existing vector data associated with a first image of a location to a second image, said system comprising at least one computing device comprising at least one processor in communication with a memory, said at least one is programmed to:

receive the first image of the location, the second image of the location, and the existing vector data associated with the first image of the location;

identify a first plurality of points in the first image and a second plurality of points in the second image, wherein the first plurality of points correspond to one or more locations in the first image, and wherein the second plurality of points correspond to the one or more location in the second image;

identify a plurality of controls determined based on the first plurality of points and the second plurality of points;

apply the plurality of controls to the existing vector data to generate updated vector data, wherein updated vector data is associated with the second image of the location; and store, in the memory, the updated vector data associated with the second image.

8. The system of claim 7, wherein said at least one processor is further programmed to obtain the plurality of controls by generating the plurality of controls by registering the first image to the second image.

9. The system of claim 7, wherein each control of the plurality of controls comprises a control vector associated with at least one point in the first image and a corresponding point in the second image.

10. The system of claim 9, wherein each control of the plurality of controls comprises a control vector pointing from its associated at least on point in the first image to its associated at least one point in the second image.

11. The system of claim 10, wherein the existing vector data comprises a plurality of vector data points and each vector data point corresponds to a point in the first image, and said at least one processor is programmed to translate each vector data point along the control vector associated with the vector data point's corresponding point in the first image.

12. The system of claim 9, wherein the first image comprises a number of pixels, and the plurality of controls comprises fewer controls than the number of pixels in the first image.

13. A non-transitory computer-readable storage medium having computer-executable instructions embodied thereon for use in registering existing vector data associated with a first image of a location to a second images, wherein when executed by a computing device including a processor coupled to a memory, the computer-executable instructions cause the computing device to:

receive the first image of the location, the second image of the location, and the existing vector data associated with the first image of the location;

identify a first plurality of points in the first image and a second plurality of points in the second image, wherein the first plurality of points correspond to one or more locations in the first image, and wherein the second plurality of points correspond to the one or more location in the second image;

identify a plurality of controls determined based on the first plurality of points and the second plurality of points;

apply the plurality of controls to the existing vector data to generate updated vector data, wherein the updated vector data is associated with the second image of the location; and store, in the memory, the updated vector data associated with the second image.

14. The non-transitory computer-readable storage medium of claim 13, further comprising computer-executable instructions that, when executed by a computing device including a processor coupled to a memory, cause the computing device to generate the plurality of controls by registering the first image to the second image.

15. The non-transitory computer-readable storage medium of claim 13, wherein each control of the plurality of controls comprises a control vector associated with at least one point in the first image and pointing to a corresponding point in the second image with which the control vector is associated.

16. The non-transitory computer-readable storage medium of claim 15, wherein the existing vector data comprises a plurality of vector data points and each vector data point corresponds to a point in the first image, and said computer-executable instructions cause the computing device to translate each vector data point along the control vector associated with the vector data point's corresponding point in the first image.

17. The non-transitory computer-readable storage medium of claim 13, wherein the first image comprises a number of pixels, and the plurality of controls comprises fewer controls than the number of pixels in the first image.

* * * * *

UNITED STATES PATENT AND TRADEMARK OFFICE
CERTIFICATE OF CORRECTION

| | |
|---|---|
| PATENT NO. | : 9,734,394 B2 |
| APPLICATION NO. | : 14/619754 |
| DATED | : August 15, 2017 |
| INVENTOR(S) | : Robert J. Klein et al. |

It is certified that error appears in the above-identified patent and that said Letters Patent is hereby corrected as shown below:

In the Claims

In Claim 7, Column 7, Line 47, delete "one is programmed" and insert therefor -- one processor is programmed --.

Signed and Sealed this
Twenty-sixth Day of September, 2017

Joseph Matal
*Performing the Functions and Duties of the
Under Secretary of Commerce for Intellectual Property and
Director of the United States Patent and Trademark Office*